July 7, 1970

R. G. WALKER 3,519,862

INSULATING WEDGE FOR CORE SLOTS IN DYNAMOELECTRIC MACHINES
AND THE LIKE AND MACHINE FOR MAKING THE SAME

Filed Oct. 25, 1968

INVENTOR.
ROBERT G. WALKER

BY

Jeffers and Young
ATTORNEYS

INVENTOR.
ROBERT G. WALKER

BY

*Jeffers and Young*
ATTORNEYS

United States Patent Office 3,519,862
Patented July 7, 1970

3,519,862
INSULATING WEDGE FOR CORE SLOTS IN DYNA-
MOELECTRIC MACHINES AND THE LIKE AND
MACHINE FOR MAKING THE SAME
Robert G. Walker, Fort Wayne, Ind., assignor to Indus-
tra Products, Inc., Fort Wayne, Ind., a corporation of
Indiana
Filed Oct. 25, 1968, Ser. No. 770,643
Int. Cl. B26d 1/46; H02k 3/34, 3/48
U.S. Cl. 310—214                                      8 Claims

ABSTRACT OF THE DISCLOSURE

An insulating wedge for a slot in a magnetic core for dynamoelectric machines and the like is provided with two opposed slits at each end to form four retaining tabs that extend outward and prevent the wedge from falling or being pushed out of the core slot when turns of wire are pushed into the core slot. The machine for slitting the wedge has two parallel, spaced, fixed cutting edges and a movable cutter with two parallel, spaced surfaces that fit between the fixed cutting edges. The cutter has an opening between its two spaced surfaces to form four cutting edges which cooperate with the two fixed cutting edges to provide the four slits in one operation of the cutter.

BACKGROUND OF THE INVENTION

My invention relates to an improved insulating wedge and to a machine for making such a wedge. My invention relates particularly to an insulating wedge having four slits which provide four tabs that retain the wedge in a slot in a magnetic core, and particularly to a machine for making such a wedge in one cutting operation.

In the manufacture of dynamoelectric machines, such as motor stators for example, it is frequently necessary that several separate sets of wire turns be positioned in a single slot in the magnetic core. The separate sets of wire turns are necessary in order to provide a particular operation or arrangement. In the motor stator example, one set of wire turns may be needed to provide starting torque for the motor, and another set of wire turns may be needed to provide running torque for the motor. It is generally desirable, and in some cases it may be necessary, that a wedge or sheet of insulating material be positioned between the two sets of wire turns. The voltage between the two sets of turns may have different phases and may be of such magnitude that the wire insulation on each turn is insufficient. Previously, when the insulating wedge was placed over the first set of turns in a slot, the wedge has had a tendency to fall out or to be pushed out when the second set of turns was placed in the slot. This was because the second set of turns had to be pushed in a direction along the slot that tended to push the insulating wedge out of the slot. This tendency of the insulating wedge to fall out or to be pushed out of the slot has created manufacturing or assembly problems. For example, a machine for placing the sets of wire turns in a slot is relatively complex and the available space around the machine and stator is limited, so that it would be difficult or impossible to effectively modify the machine. Hence, in the manufacture or assembly of dynamoelectric machines, a machine may be completed with insulating wedges lacking, since the wedges may fall out of their slots without the operator knowing it. One or more missing wedges requires that the dynamoelectric machine be rebuilt or scrapped.

Accordingly, an object of my invention is to provide an improved insulating wedge for use in slots in magnetic cores and like devices.

Another object of my invention is to provide an improved insulating wedge which can be easily inserted in a slot in a magnetic core, and which remains in the slot despite subsequent sets of wire turns being placed in the slot.

Another object of my invention is to provide an improved insulating wedge having retaining tabs which project outward beyond the slot in such a manner as to retain the insulating wedge in the slot of a magnetic core.

Another object of my invention is to provide an improved insulating wedge which resists being moved out of a slot once the wedge is inserted in the slot.

Another object of my invention is to provide an improved machine for making insulating wedges for use in slots in magnetic cores.

Another object of my invention is to provide an improved machine for slitting insulation wedges to provide retaining tabs on the wedges.

Another object of my invention is to provide an improved machine for making four slits in an insulating wedge in one cutting operation.

SUMMARY OF THE INVENTION

Briefly, these and other objects are achieved in accordance with my invention by an insulating wedge having a selected length, width, and thickness. The wedge is provided with two opposed slits which extend toward each other from the edges forming the length at one end of the wedge, and with two opposed slits which extend toward each other from the same edges but at the other end of the wedge. These four slits form tabs which retain the wedge in a slot of a dynamoelectric device, such as a motor stator. Also in accordance with my invention, I provide a machine for making such wedges. The machine has a fixed guide having a riding surface for receiving a length of insulating material. The fixed guide has a slot in its riding surface. This slot is formed by two spaced, parallel walls that form fixed parallel cutting edges in the riding surface. A movable cutter is positioned above the riding surface. The cutter has two spaced, parallel surfaces for fitting between the plane walls of the fixed guide. The cutter also has an opening extending between its plane surfaces to form four cutting edges. With insulating material positioned on the riding surface of the fixed guide, a single downward operation of the cutter between the fixed cutting edges provides the four slits in the insulating material. The cutter may be dimensioned to provide the four slis for a single wedge, or may be dimensioned to provide two slits at the adjacent ends of two wedges, depending upon the operation to be provided by the machine.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENTS

Figure 1:
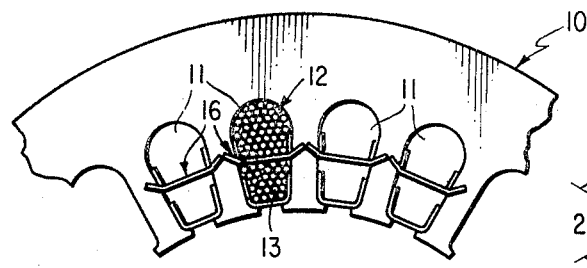
FIG. 1 shows a plan view of a portion of a motor stator for illustrating a typical use for my insulating wedge.

In FIG. 1, I have shown a portion of a motor stator 10 for illustrating a typical use for the improved insulating wedge in accordance with my invention. However, it is to be understood that my insulating wedge may be used in almost any slotted magnetic structure. As known in the art, the motor stator 10 comprises a plurality of slots 11 which form the poles of the electric motor. The slots 11 are provided with oen or more sets 12, 13 of wire turns. In many applications, it is necessary that the set 12 of wire turns be further insulated from the set 13 of wire turns. This additional insulation may be needed where the two sets 12, 13 of wire turns have different electrical phases, or have different electrical voltages. When the first set 12 of wire turns is positioned in the slot 11, an insulating wedge 16 is then positioned over the set 12 of wire turns along the length of the slot 11. Previously, when the additional set 13 of wire turns was then inserted into the slot 11, there was a tendency for the insulating wedge 16 to fall or be pushed out of the slot 11. This was particularly true where an inserting tool was moved along the length of the slot 11 along the surface of the insulating wedge 16. This tool motion tended to push the insulating wedge 16 out of the slot 11. In accordance with my invention, the insulating wedge 16 is provided with slits which form tabs that retain the insulating wedge 16 in the slot 11.

Figure 2:
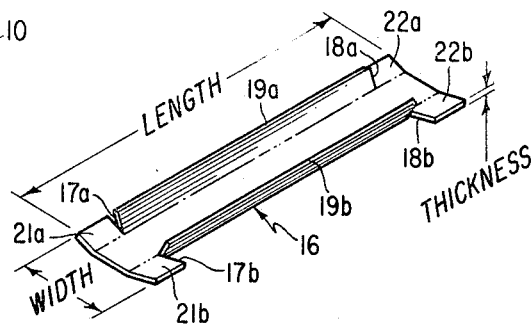
FIG. 2 shows a perspective view of an insulating wedge in accordance with my invention.

FIG. 2 shows a perspective view of my insulating wedge 16. Typicallly, the insulating wedge 16 may be formed from a sheet of insulating material, such as treated paper, Mylar, or laminated combinations of both. The wege 16 is rectangular in shape, and has a selected length, a selected width, and a selected thickness formed by edges and surfaces as indicated in FIG. 2. The wedge 16 of insulating material is provided with first and second pairs of opposed slits 17a, 17b, and 18a, 18b. The slits 17a, 17b are cut inward toward each other from the two edges forming the length, near one end of the wedge 16; and the slits 18a, 18b are cut inward toward each other from the same two edges, but near the other end of the wedge 16. The wedge 16 has a width somewhat greater than the width of the slot 11 at which the wedge 16 will be positioned, so that the intermediate portions 19a, 19b can be bent upward along the length to permit the wedge 16 to be inserted in the slot 11. When the slits 17a, 17b are formed in the wedge 16, two respective tabs 21a, 21b are formed at one end, and when the slits 18a, 18b are formed in the wedge 16, two respective tabs 22a, 22b are formed in the wedge 16 at the other end. When the wedge 16 is positioned in the slot 11 over the first set 12 of turns, the tabs at one end are bent in the same manner as the portions 19a, 19b. However, once the wedge 16 is positioned in the slot 11, the tabs 21a, 21b and the tabs 22a, 22b spring outward as shown in FIG. 2 to form retaining portions that prevent the wedge 16 from being moved along the length of the slot 11. Obviously, the distance between the slits 17a, 18a and the distance between the slits 17b, 18b must be at least at great as or slightly longer than the length of the slot 11 in which the wedge 16 is to be positioned. It will thus be seen that the wedge 16 is better than previous wedges in that it is retained in the solt 11, and requires only a slight additional amount of material to form the tabs 21a, 21b, 22a, 22b. However, these tabs 21a, 21b, 22a, 22b firmly retain the wedge 16 in the slot 11, and permit additional sets of turns, such as the set 13 in FIG. 1, to be positioned in the same slot 11 without the wedge 16 falling out or being pushed out of its proper insulating position.

Figure 3:
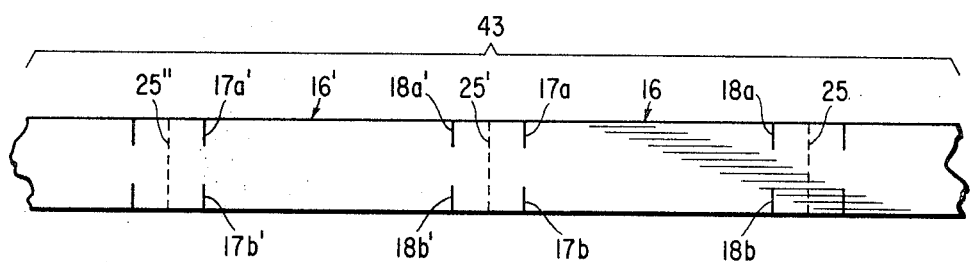
FIG. 3 shows a strip of elongated insulating material provided with slits in accordance with my invention for providing a plurality of my insulating wedges.

FIG. 3 shows a view illustrating how a plurality of wedges 16, 16' may be formed from a single strip or length 43 of insulating material. In FIG. 3, the wedge 16 would be provided with slits 17a, 17b, 18a, 18b; and the wedge 16' would be provided with slits 17a', 17b', 18a', 18b'. After the slits have been formed, the wedges 16, 16' can be separated by being cut along the dashed lines 25, 25', 25". The wedges 16, 16' could also be separated along the lines that are curved or shaped in some other desired fashion. Thus, it will be seen that my wedges not only provide improved characteristics, but may be formed from a single strip 43 of insulating material which is provided with slits, and then subsequently cut apart to provide the separate wedges.

Figure 5A:
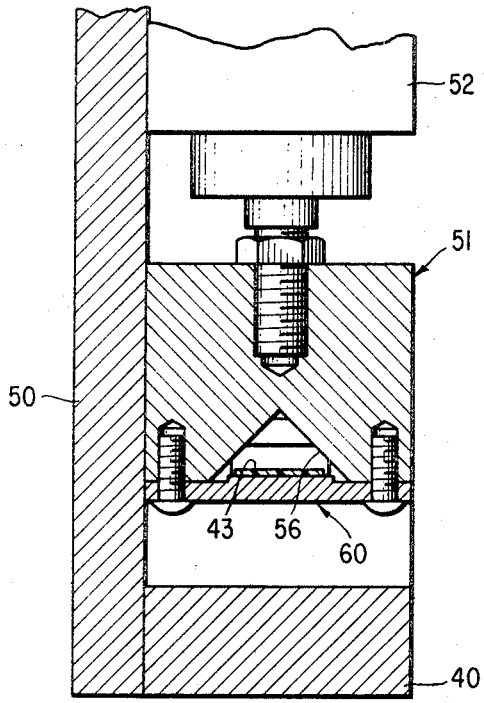
FIG. 5a and 5b show cross-sectional views, taken along line 5—5 of FIG. 4, with the machine in the open position and in the cutting position.
Figure 4:
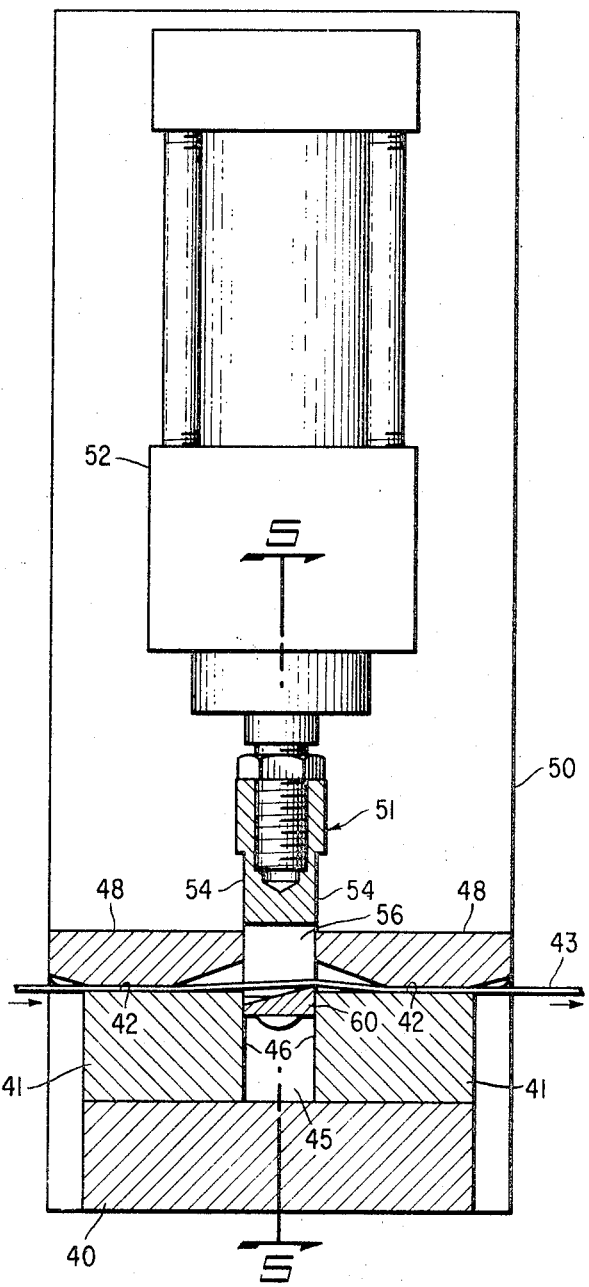
FIG. 4 shows a side elevation view, partly in cross section, of a machine in accordance with my invention for making the insulating wedges of FIGS. 2 and 3.

FIG. 4 shows a side elevation view, partly in cross section, of a machine in accordance with my invention for providing the two pairs of slits 17a, 17b, 18a', 18b' in a strip 43 of insulating material in one operation. FIG. 5a is a cross-sectional view taken along the line 5—5 of FIG. 4. The machine comprises a base 40 on which a fixed guide 41 is mounted. The fixed guide 41 provides a riding surface 42 on which the strip 43 of insulating material is positioned. The strip 43 of material moves in the direction indicated by the arrows in FIG. 4. The fixed guide 41 is provided with a slot 45 that has two accurately formed, parallel, plane walls 46. Two members 48 are positioned above the riding surfaces 42 to provide a guide for the strip 43 of material.

Figure 6:
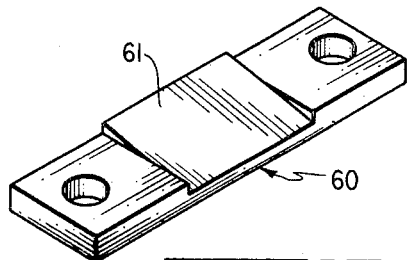
FIG. 6 shows a perspective view of a portion of the machine of FIGS. 4, 5a, and 5b.

A fixed back 50 is attached to the base 40 and extends upward to provide support and guide means for a movable cutter 51. The cutter 51 is attached to a suitable mechanism 52 which is positioned on the back 50 by some means, such as slides or ways, so that the cutter 51 may be moved up and down in a reciprocal fashion. The cutter 51 is provided with two accurately formed, parallel, plane surfaces 54 which are spaced so that they just fit within the walls 46 of the slot 45 in the fixed guide 41. As shown in FIG. 5a, the cutter 51 is provided with an inverted V-shaped opening 56 which extends between the surfaces 54. This opening 56 forms four cutting edges which operate in a cutting or shearing relation with the edges provided on the fixed guide 41 at the intersection of the walls 46 and the riding surfaces 42. While various shapes may be provided for the opening 56, I have found that the inverted V-shape formed with plane surfaces that intersect at a right angle at its upper vertex is relatively easy to form and keep sharp. The opening 56 is bridged at the bottom by a support member 60, which is preferably removable. This support member 60 is shown in perspective view in FIG. 6, and comprises a sloping ramp surface 61 to guide the strip 43 of material in the proper manner as it passes over the riding surfaces 42.

Figure 5B:
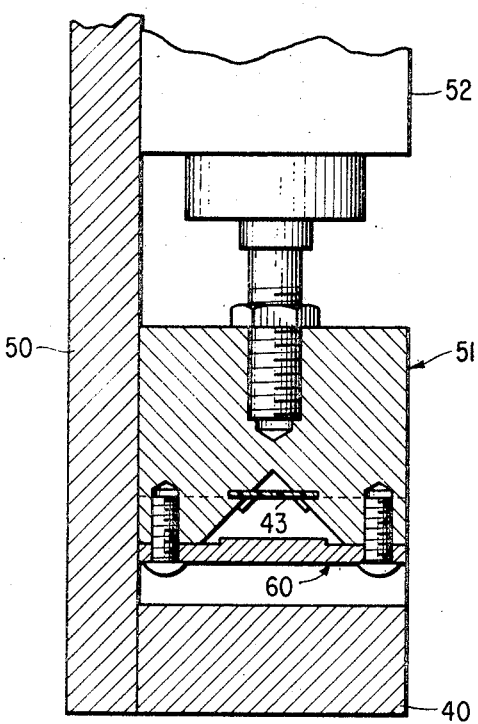

When the machine of FIGS. 4 and 5a is operated, the strip 43 of material is threaded through the opening between the positioning members 48 and the riding surfaces 42, and also through the opening 56 in the cutter 51. As shown in FIGS. 4 and 5a, the strip 43 of material has been moved to a position to be cut. When the strip 43 of material is to be provided with slits, the mechanism 52 is moved downward so that the cutter 51 moves down into the slot 45. The cutter surfaces 54 and the walls 46 in the fixed guides 41 provide a shearing action at their respective edges, and this shearing action provides a set of slits, such as the slits 18a', 18b', 17a, 17b shown in FIG. 3. When the cutter 51 is in its lowest cutting position, it has the position with respect to the strip 43 of material as shown in FIG. 5b. In FIG. 5b, it will be seen that the shearing or cutting is directed inward from the opposite edges of the strip 43 of material. Thus, a relatively simple machine in accordance with my invention can provide the four necessary slits in a sheet of material in a single cutting action. After a cutting operation, the cutter 51 is raised, and the strip 43 of material can be moved forward to a new position for another cutting operation. At some appropriate location beyond the machine, the strip 43 of material can be cut into individual wedges 16 16' along the dashed lines 25, 25', 25", as shown in FIG. 3.

It will thus be seen that my invention provides a new and improved wedge and a machine for making such a wedge. Both the wedge and the machine are easily used in automatic or mass production applications. While I have shown only one embodiment of my wedge and my machine, persons skilled in the art will appreciate that modifications may be made. For example, while I have shown the slits being along straight lines at right angles to the edges forming the length of the material, these slits may be curved or oriented at different angles, depending upon preference and design. Different slits would, of course, require different shaps of the surfaces 54 and the walls 46. Also, while I have shown a machine which provides two slits for one wedge and two slits for another wedge, it is possible to provide the four slits for a single wedge. With reference to FIG. 3, this can be achieved by spacing the surfaces 54 of the cutter 51 and the walls 46 of the fixed guide 41 farther apart. In other words, if the surfaces 54 and the walls 46 are spaced a distance equal to the distance between the slits 17a and 18a, then the slits 17a, 17b, 18a, 18b could be formed instead of the slits 18a', 18b', 17a, 17b. As previously mentioned, the opening 56 in the cutter 51 may have other shapes. The positioning members 48 may be movable with the cutter 51 so as to provide a clamping action on the strip 43 of material when the cut is actually made. And, the support member 60 may be omitted, although it is preferable to use it. It should be pointed out that it is possible to provide one set of opposite slits at only one end of a wedge. This is particularly true where a wedge is subjected to a force in only one direction when turns of wire are inserted or when other operations are performed. In such cases, the one set of slits would be near the wedge end from which the force is applied, so as to provide tabs which prevent the wedge from being pushed out of the slot. Therefore, while my invention has been described with reference to particular embodiments, it is to be understood that modifications may be made without departing from the spirit of the invention or from the scope of the claims.

What I claim as new and desire to secure by Letters Patent of the United States is:

1. An improved wedge for insulating a first set of wire turns positioned in a slot in a magnetic core of a stator from a second set of wire turns to be positioned in said slot, said wedge comprising:
    (a) a sheet of insulating material having a generally rectangular shape with a selected length, width, and thickness;
    (b) said sheet of material having a first pair of opposed slits extending inwardly from opposite edges forming the length of said sheet of material, said first pair of opposed slits being near one edge forming the width of said sheet of material;
    (c) and said first pair of slits forming tabs which project outward when said wedge is positioned in said slot of said magnetic core to prevent said wedge from sliding out of said slot when a second set of wire turns are positioned in said slot.

2. The improved wedge of claim 1 wherein said first pair of opposed slits lie along a straight line that is substantially perpendicular to said edges forming the length of said sheet of material.

3. An improved wedge for insulating a first set of wire turns positioned in a slot in a magnetic core from a second set of wire turns to be positioned in said slot, said wedge comprising:
    (a) a sheet of insulating material having a generally rectangular shape with a selected length, width, and thickness;
    (b) said sheet of material having a first pair of opposed slits extending inwardly from opposite edges forming the length of said sheet of material, said first pair of opposed slits being near one edge forming the width of said sheet of material;
    (c) said sheet of material having a second pair of opposed slits extending inwardly from opposite edges forming the length of said sheet of material, said second pair of opposed slits being near the other edge forming the width of said sheet of material;
    (d) and said first and second pairs of slits forming tabs which project outward when said wedge is positioned in said slot of said magnetic core to prevent said wedge from sliding out of said slot when a second set of wire turns are positioned in said slot.

4. The improved wedge of claim 3 wherein said first and second pairs of slits are substantially perpendicular to said edges forming the length of said sheet of material.

5. The improved wedge of claim 3 wherein said first pair of opposed slits and said second pair of opposed slits are spaced substantially equal distances from one edge and said other edge respectively.

6. The improved wedge of claim 5 wherein said first and second pairs of opposed slits lie along straight lines that are substantially perpendicular to said edges forming the length of said sheet of material.

7. An improved insulating member for a slot in a magnetic core structure, comprising:
    (a) a generally elongated sheet of insulating material having a selected length formed by spaced, generally parallel edges, a selected width formed by spaced edges of selected shape, and a selected thickness formed by spaced, generally parallel surfaces;
    (b) said sheet of material having a first pair of slits positioned near one end of said sheet of material and extending inwardly a selected distance from said edges forming said length;
    (c) said sheet of material having a second pair of slits positioned near the other end of said sheet of material and extending inwardly a selected distance from said edges forming said length;
    (d) each of said slits forming a tab between the slit and its respective end of said sheet of insulating material;
    (e) and said sheet of material being shaped so that the portion of said sheet of material between the two slits on each of said edges fits in a slot of a magnetic core structure, and so that said tabs extend outwardly to engage the surface of the magnetic core structure in which said slot is formed to retain said insulating member in said slot.

8. The improved insulating member of claim 7 wherein said first pair of slits are substantially perpendicular to their respective edges and lie along a straight line, and wherein said second pair of slits are substantially perpendicular to their respective edges and lie generally along a straight line.

References Cited

UNITED STATES PATENTS

| 2,283,146 | 5/1942 | Zoller | 310—214 |
| 2,723,358 | 11/1955 | Holmgren | 310—214 |
| 2,998,540 | 8/1961 | Phillips | 310—214 |
| 3,355,610 | 11/1967 | Staff | 310—214 |

WARREN E. RAY, Primary Examiner

U.S. Cl. X.R.

72—326